Aug. 26, 1969     A. S. PENFOLD     3,463,150
SELF-CONTAINED THERMAL AND RESPIRATORY LIFE SUPPORT SYSTEM
Filed June 22, 1964     3 Sheets-Sheet 1
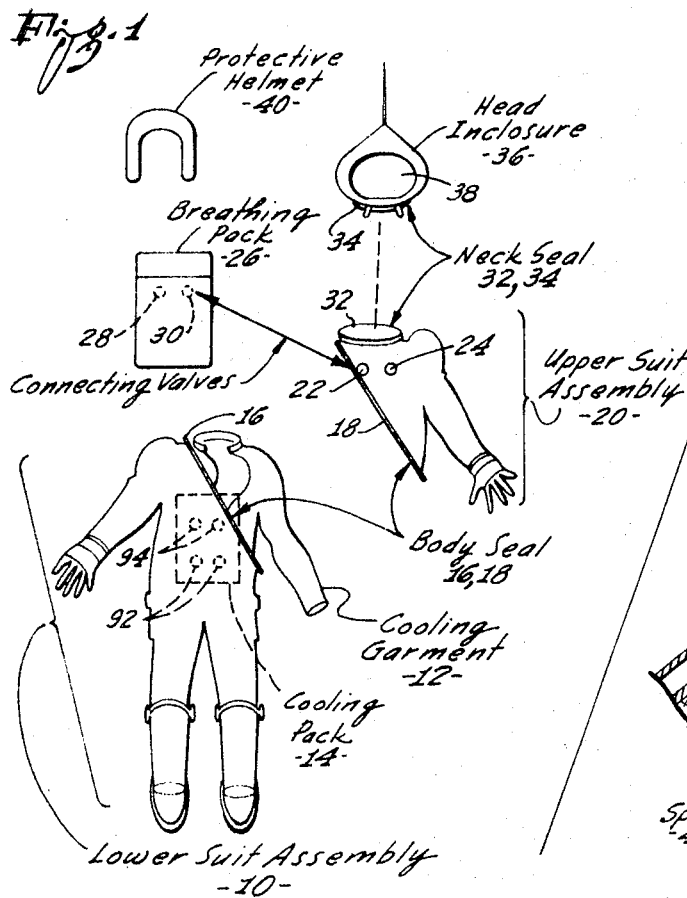
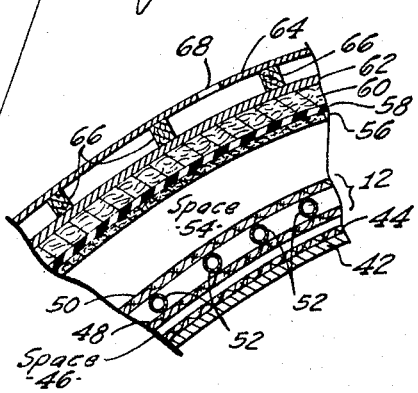
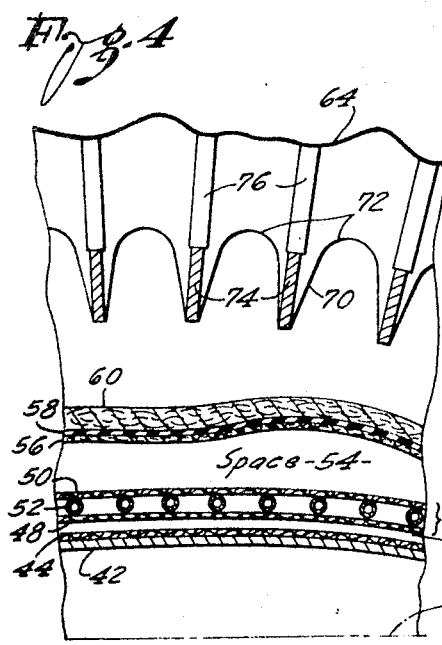
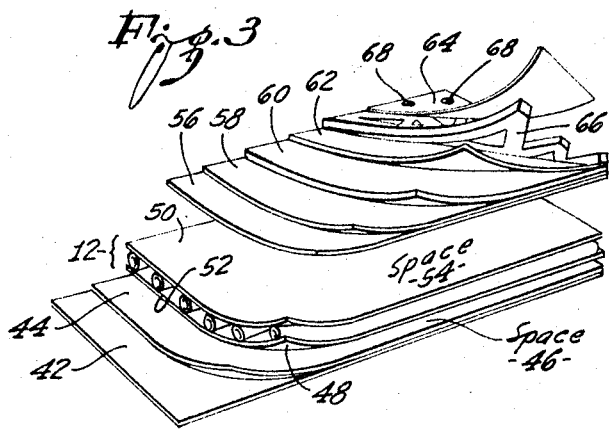
INVENTOR:
Alan S. Penfold
By John L. Sharts
Attorney Aug. 26, 1969 A. S. PENFOLD 3,463,150
SELF-CONTAINED THERMAL AND RESPIRATORY LIFE SUPPORT SYSTEM
Filed June 22, 1964 3 Sheets-Sheet 2
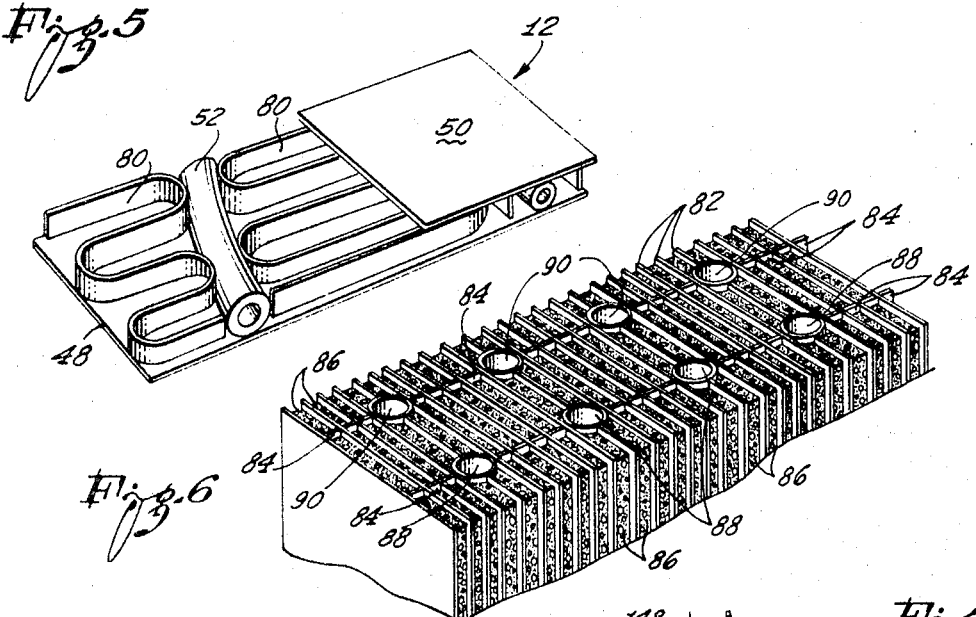
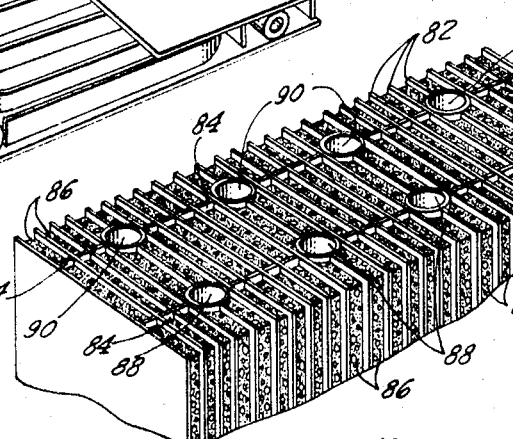
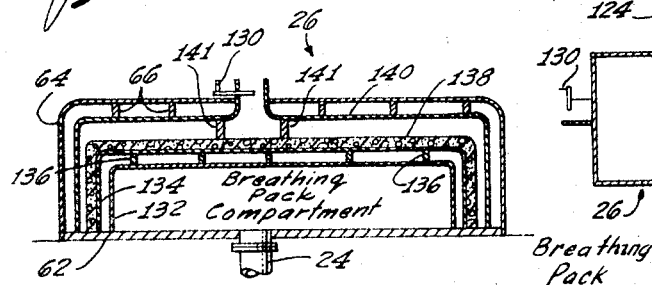
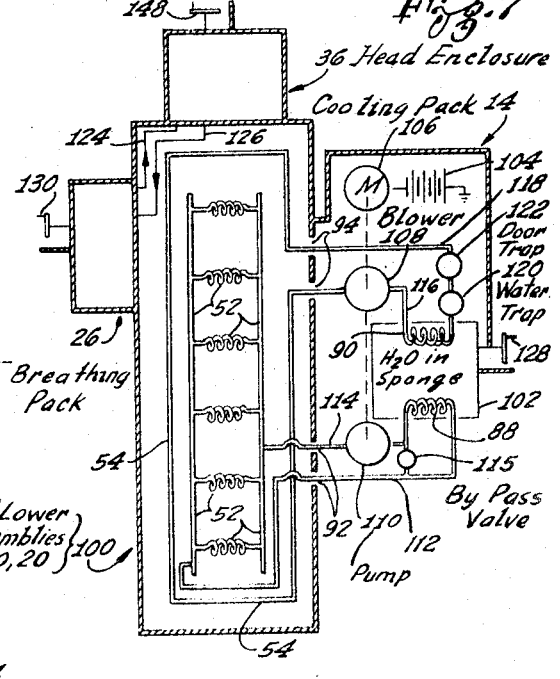
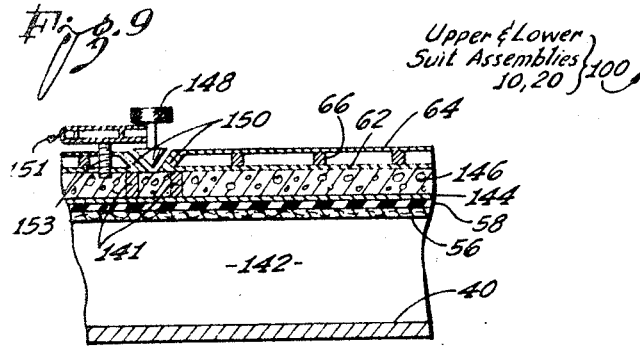
INVENTOR:
Alan S. Penfold
By John L. Stewart
Attorney

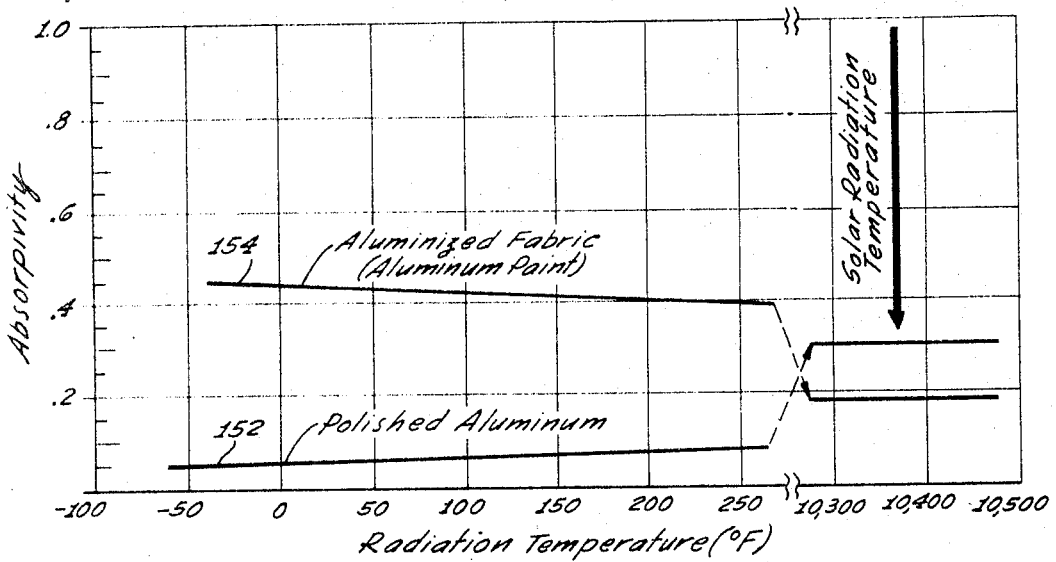
Fig. 10
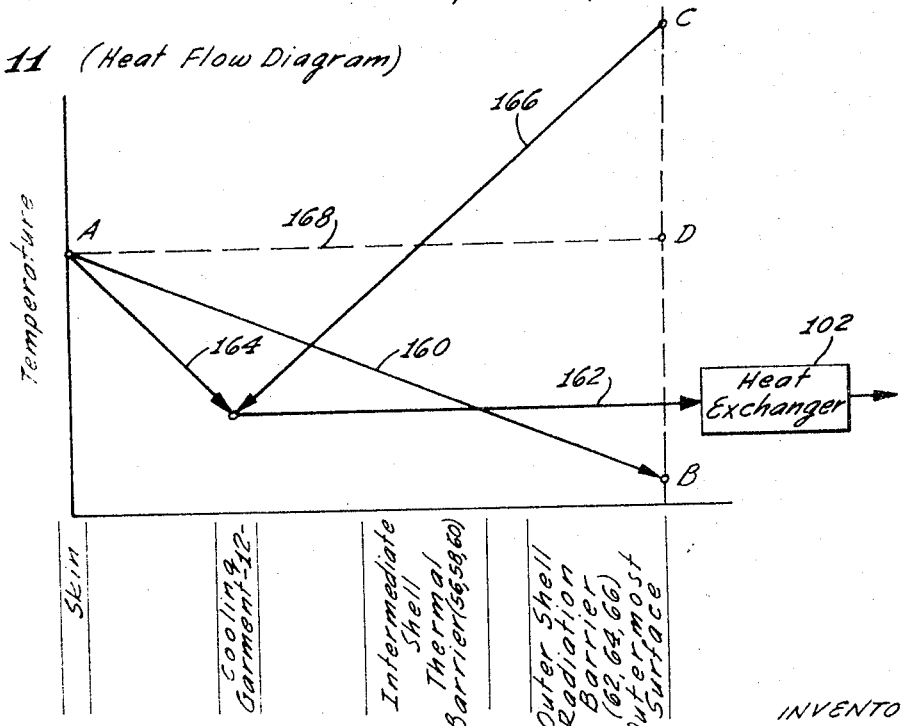
Fig. 11 (Heat Flow Diagram)

3,463,150
SELF-CONTAINED THERMAL AND RESPIRATORY LIFE SUPPORT SYSTEM
Alan S. Penfold, Los Angeles, Calif., assignor to Litton Industries, Inc., Beverly Hills, Calif.
Filed June 22, 1964, Ser. No. 376,745
Int. Cl. A62b 7/10; G05d 32/00
U.S. Cl. 128—142.5       10 Claims

ABSTRACT OF THE DISCLOSURE

A self-contained thermal control system for space suits having at least two separate control systems; one to conduct body heat away from the body of the wearer, to dissipate such heat into space, and the other to protect the wearer from external thermal conditions such as extremes in temperature. One system includes a cooling garment having a plurality of conduits filled with a cooling fluid and a closed loop circulatory system which conducts the cooling fluid through the conduits to a heat exchanger to dissipate the body heat into space, and the other system includes a heat insulating shell encompassing the cooling garment to shield against external thermal conditions.

---

The present invention relates to space suits and, more particularly, to thermal and respiratory life support systems for extra vehicular space environments, such as those encountered, for example, by an astronaut landing on the lunar surface when he leaves his space vehicle.

The latest developments in the field of space travel have shown that exploration of outer space, including for example the surface of the moon, by manned space vehicles is in immediate prospect. In fact, astronauts have already orbitted the earth and there is no doubt that manned space ships will be sent to the moon in the near future; as a matter of course, the ships will be equipped to make the return trip to earth.

It will be clear that a great number of intricate problems are connected with this tremendous project, and also that numerous difficulties have already successfully been overcome. No doubt, a trip to the moon would be of much greater value from every point of view if the spacemen are equipped to leave their vehicle and actually set foot on the lunar surface. This project is coming progressively closer to realization, and, at the present time, scientists believe that all of the remaining difficulties can be overcome, so that landing on the lunar surface will be achieved in the near future.

Therefore, there exists a need for equipment which enables an astronaut to not only land on the moon, but to emerge from his vehicle, at least for a limited time, to accomplish a mission which will be of the utmost value. In order to enable a man to actually remain on the lunar surface, he must be supplied with scientific instrumentation and communication equipment, for accomplishing his mission, and also protection from whatever might endanger his mobility, alertness or even his life, at least to the extent that this can be foreseen before the first trip to the moon has been accomplished.

The present invention is concerned with equipment for preserving the life of a spaceman leaving his vehicle under conditions present in outer space. Features refer to protection of a wearer from the extreme temperature conditions he is expected to meet during a space mission, perhaps on the lunar surface, and also with a supply of breathable oxygen-rich gas for producing respiratory conditions as close to normal as possible. A complete equipment for an astronaut in order to permit him to safely move around must fulfill all of the requirements for survival and allow the astronaut to accomplish his mission. Such equipment will of necessity take the form of what has been frequently termed a "space suit," i.e. a pressure-tight, harness-like garment which must be self-contained by having built-in, or attached to it, all the components that are needed for the purpose.

The complexity of the problem is increased by the existence of a weight limit so that the wearer of the suit is not impeded when moving around even under the reduced gravitational conditions in space or on the moon. In addition, the space suit assembly must provide for flexibility in the region of most of the joints or articulations of the human body. Further, the space suit or harness must be pressure-tight, of considerable mechanical strength, and fully equipped in every possible respect to insure survival.

As stated above, the present invention is principally concerned with a self-contained thermal and respiratory life support system for extra-vehicular space environments, and this terminology is intended to define the equipment of, for example, a space suit specifically designed for protection from heat and cold, and also for the provision of normal respiratory conditions. Although movable joints in the space suit, communication equipment, scientific instruments and many other essential elements such as seals, connectors, search lights and a feeding port, to name some of them, pose problems to the designer of a space suit, they are not treated in the present specification.

In the past, numerous types of protective suits have been developed, and garments to be worn under high or low temperature conditions are well known in the art. Suits into which air is pumped for cooling purposes or for providing normal respiration conditions in vacuum environments have also been suggested. However, never before have these factors been brought together as a requirement for a single suit.

The conditions of extreme temperatures which the astronaut will meet are: working on the surface of the moon in full sunlight, and working in interplanetary space when shadowed by the spacecraft or by the moon. On the surface of the earth, the radiant energy of the sun is reduced to a fraction of that which is present in space. Furthermore, the atmosphere tends to conduct heat from sunny to shadowed areas on the earth. Without the moderating effect of the atmosphere, spacemen encounter drastic changes in temperature between sunny and shaded work areas.

It will be evident that a space suit must afford protection from these extreme temperatures if the astronaut is to sucessfully accomplish a mission on the moon. In this regard, space suits with built-in electrical heaters have been suggested. However, such heating equipment of necessity includes a current source of considerable volume and weight, and these requirements exceed the limits allowable in a space suit of practical value. On the other hand, the natural reaction of the human body to extreme heat is to produce sweat as a cooling means. Space suits in which a cooling-action due to sweating is intentionally produced, or in which it is included in the computation of heat balance, bring extreme discomfort to the wearer. This might not only result in impairing his vision by sweat running down his forehead but it might endanger his life by reducing his alertness to a point that he is unable to react properly. In short, the provision of comfort for the astronaut is important to his survival and for the accomplishment of his mission.

Accordingly, it is one of the main objects of the present invention to provide conditions of comfort for a wearer of a space suit with respect to either temperature, or breathing atmosphere, or both.

Another important object of the invention is to provide for heat transfer conditions in a space suit in such a manner that the heat produced by the wearer is sufficiently preserved to maintain a comfortable temperature even under coldest conditions; in other terms, the body is the only heat source within the suit.

A further object of the invention is to transfer heat from the body into outer space at a rate sufficient to prevent the wearer from experiencing excessive heat even with the maximum radiated energy impinging on the outer surface of the space suit.

Other objects of the invention include the prevention of uncomfortable conditions by ventilating the space within the suit, cooling the breathable oxygen-rich gas supplied to the head section of the suit, additionally cooling the head section without the use of cumbersome structures, and protecting the wearer from impinging radiant energy by means of a specifically designed outer shell for both the body section and the head section of the space suit.

In accordance with one of the underlying principles of the invention, a self-contained thermal control system for space suits is composed of a cooling garment having a plurality of conduits filled with a cooling fluid and a closed loop circulatory system which conducts the cooling fluid through the conduits, a heat insulating shell encompassing the cooling garment to protect a wearer from external elements such as extremes in temperature, and a heat exchanger operatively coupled to the closed loop system for dissipating into space, at a controlled rate, the heat conveyed by the cooling fluid.

In accordance with another feature of the invention, a heat exchanger suitable for cooling the cooling fluid, or for cooling oxygen-rich gas supplied to circulate around the cooling garment and inside the heat-insulating shell, may include a plurality of cooling fins, a system of conduits for the fluid which must be cooled in thermal contact with the fins, and porous bibulous material arranged between adjacent fins. The porous bibulous material, such as sponge, is impregnated with another cooling fluid and evaporation thereof into the surrounding space may be controlled by adjusting a valve mounted for example in an aperture in the enclosure for the heat exchanger. It should be noted that the fluid evaporates into outer space and this process therefore occurs at a comparatively high rate so that a significant cooling effect can be obtained practically instantly and with relatively small quantities of evaporating fluid.

A further feature of the invention includes a specific composition of the multilayer shell forming the wall of the space suit, with special emphasis on a radiation reflecting outer shell composition, of which one layer also forms the main vacuum barrier of the suit.

Additional features relate to the selection of specific materials to achieve proper heat balance, provisions for independently cooling the head section of the space suit, and arrangements for conducting heat toward the valves controlling evaporation in order to prevent the valves from freezing under extreme cold conditions.

It will be seen that a space suit equipped with a thermal control and respiratory life support system embodying features of the present invention constitutes a self-contained unit. It relies on the human body as the only heat source, on a ventilation system for removing odor and preventing excessive perspiration, and on the principle of cooling off both the fluid circulating within the internally worn cooling garment and the oxygen-rich gas used for ventilation and respiration, suitably in two separate closed loop conduit systems, with the cooling action produced by controlled evaporation of a cooling fluid into outer space. All of the requirements for survival, comfort and movability of the wearer, even under extreme space conditions, are fulfilled without relying on additional heating apparatus or the mechanism of sweating, using comparatively reliable structures such as heat insulation and controlled evaporation heat exchangers for producing the desired heat balance for both thermal control and providing normal respiratory conditions. Complex servo-systems which could constitute sources of failure are avoided throughout the entire system.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 is a schematic front view illustrating the disassembled portions of a space suit incorporating the thermal control and respiratory life support system in accordance with the invention;

FIG. 2 is a cross sectional view of the multilayer shell forming the main portions of the space suit of FIG. 1;

FIG. 3 is a "peel-back" view of the shell of FIG. 2;

FIG. 4 is a cross sectional view of the multilayer shell of FIG. 2, taken in the area of a joint accommodating any of the essential joints of the human body;

FIG. 5 is a more detailed isometric view of the cooling garment forming the innermost portion of the shell of FIGS. 2 and 3;

FIG. 6 is an isometric view of the heat exchanger used in the cooling pack of FIG. 1;

FIG. 7 is a schematic block diagram illustrating the flow of cooling fluids and oxygen through the different components of the system;

FIG. 8 is a schematic cross sectional view of the heat exchanger for the breathing pack;

FIG. 9 is a schematic cross sectional view of the head inclosure illustrating the heat exchanger in the head inclosure;

FIG. 10 is a diagram illustrating the absorptivity characteristics of materials suitable for use as the outer portion of the shell of FIGS. 2 and 3, plotted versus radiation temperature; and FIG. 11 is a schematic diagram illustrating heat flow through the space suit under extreme temperature conditions.

Referring now to the drawing, in which similar or identical elements are designated by the same reference numeral, FIG. 1 illustrates, in an exploded view, the main portions of a space suit equipped with the life support system in accordance with the invention.

Five physically separate portions may be distinguished. The first seen at the bottom of FIG. 1 is a lower suit assembly, generally designated 10, including as a built-in component the cooling garment 12, described in more detail below and forming the innermost layer of the shell-type structure of the lower suit assembly. As mentioned above, many of the elements involved in a space suit, such as the knee joints and the portions covering the hands and the feet, are indicated in FIG. 1 for the sake of completeness but are not described in detatil. A cooling pack 14 is secured to the back portion of the lower suit assembly 10, as indicated by broken lines in FIG. 1. Structure and operation of the cooling pack will be described in detail further below, but it should be mentioned at this point that the cooling garment 12 includes a closed loop circulatory conduit system filled with a cooling fluid, and one of the important functions of the cooling pack is to remove heat from the cooling fluid and dissipate it into outer space. At its upper rim, the lower suit assembly terminates in a diagonally extending flange 16 which forms a seal with a corresponding flange 18 of the upper suit assembly 20. It is of interest to note that the use of diagonally extending flanges results in a number of advantages. It will be understood that the cooling garment, which includes an entire network of tubes carrying the cooling fluid, must be one integral component. By combining the cooling garment 12 with the complete lower suit assembly 10, a wearer may step into both at the same time. Thus, donning the suit can be effected in a comparatively short time. As a further advantage, the cooling pack, which cools the fluid of the cooling garment may remain permanently attached to the lower suit assembly, as shown in FIG. 1, and may be put on with it. This construction eliminates the steps of attaching the cooling pack 14 to the suit, and making connections of the cooling fluid circulatory system when donning the suit, because the lower suit assembly with the cooling garment 12 and the cooling pack 14 connected and secured to it, form one unit. As mentioned above, a ventilation system for removing odors due to perspiration, for example, is also included in the life support system, and the ventilating air stream is filtered and cooled in the cooling pack, as described below. This involves two more connections between the cooling pack and the remainder of the lower suit assembly which also may be constructed as permanent connections so that the lower suit assembly including the cooling garment and the cooling pack may be stored as a unit, ready to be donned rapidly in an emergency situation.

The upper suit assembly 20 includes connecting valves 22, 24 for operatively attaching a breathing pack 26 having corresponding valves 28 and 30. The upper rim 32 of upper suit assembly 20 forms one of the two mating portions of the neck seal. The counterpart 34 of the neck seal forms part of the head inclosure 36. This inclosure is provided with a transparent double-wall window 38. A protective helmet 40, worn within the head inclosure, is also shown for the sake of completeness.

Now that the main components of a space suit have been enumerated and their physical relationship has been explained, attention is directed to FIGS. 2 and 3 which illustrate, in cross section and in a peel-back view, respectively, the construction of the multilayer shell forming the rigid portions of the space suit, which are not part of a seal or a joint. Thus, FIG. 2 is a cross sectional view that may be taken through the lower or upper leg section, through the abdominal portion, or any portion of the arm section, for example. It will be clear that in the area of a seal, such as the body seal connecting the lower and upper suit assemblies, the layers terminate and are pneumatically sealed to the flanges 16 and 18 of the body seal of FIG. 1. Furthermore, in the area of joints of the human body, a flexible connection must be provided without interrupting the continuity of some of the individual layers. The construction of a joint is shown in and discussed in connection with FIG. 4 to the extent necessary to understand the present invention.

Referring now specifically to FIGS. 2 and 3, the lowermost layer designated 42 indicates the skin of the wearer of the space suit, and the adjacent layer 44 is some undergarment, both these layers being shown for completeness but of course not forming part of the suit proper. The innermost space suit layer, in conformity with FIG. 1, is the cooling garment 12, separated from the undergarment 44 by a small airspace 46. This airspace is shown to indicate that the cooling garment is not intended to exactly fit a wearer's body. On the contrary, ventilation action, described in more detail below, is enhanced by the presence of an airspace 46, or, in other terms, if the cooling garment only loosely fits the wearer. Referring to the cooling garment proper, it includes two layers 48, 50 made of any suitable fabric with a network of flexible tubes 52 arranged between the layers 48 and 50. A more detailed view of the cooling garment is given in FIG. 5, illustrating standoff strips 80, for example, and, as mentioned above, the tubes 52 convey a cooling fluid through the entire network covering the main areas of the human body. For practical reasons, and in order to prevent cumbersome structures where cooling is either not necessary or can be effected by a separate system, the cooling garment 12 need not extend into the areas of the hands, the feet and the head of the wearer.

Above the cooling garment 12, there is a second airspace 54, of considerably greater depth. An oxygen-rich gas circulates through this air space 54 for the double purpose of heat convection (in addition to that produced by the cooling fluid in tubes 52) and also for ventilation.

The subsequent three layers 56, 58 and 60 together form an intermediate heat-insulating three-layer shell. Specifically, layers 56 and 60 may be made of flexible felt-type material of high heat-insulating properties. The layer 58 is an emergency vacuum barrier. It is suitably a sheet of rubber or similar resilient, impermeable material, bonded at both sides to the adjacent felt-type material layer 56 and 60, respectively.

The main vacuum barrier of the space suit consists of a continuous layer of sheet metal 62, such as aluminum, arranged adjacent the outer felt layer 60. It can be seen that in case the outer, main vacuum barrier 62 is fractured accidentally, be it by impact or by the wearer hitting an object or falling, the resilient layer 58 comes into action as an emergency vacuum barrier to maintain pressure within the space suit. However, it is contemplated that this emergency vacuum barrier may be omitted. Then, one layer of heat-insulating material may be substituted for the three layers 56, 58 and 60.

On top and above felt-type material layer 60 follows another three-layer shell termed herein the "outer shell" which, in turn, combines several functions, discussed below in connection with FIG. 6. This outer shell provides the main heat insulation of the entire suit, as a result of its reflectivity properties, and includes the aluminum sheet layer 62 forming the main vacuum barrier of the suit, as mentioned above, having its outer surface polished to improve the reflection of impinging radiation, an outermost layer 64 suitably formed of fabric which has been metallized on both sides, and spacing or, stand-off layer 66 separating one from another.

The terms "metallized fabric" and "aluminized fabric" are used herein to denote any suitable fabric having on its surface a deposit of minute metal particles, such as aluminum, to obtain nonconductive conditions. Generally, and as known in the art of metallization, this is achieved by treating the fabric with a colloidal suspension of the selected metal.

A peel-back view of the different layers is shown in FIG. 3, illustrating, one on top of the other, all of the different layers discussed to this point; this figure shows a typical dimensional relationship of the different components of the multilayer shell forming the walls of the space suit. It also conveys a better understanding of the outer shell which includes the stand-off layer 66 separating the polished metallic main vacuum barrier 62 from the outermost layer 64. The stand-offs are suitably formed from a heavy layer of felt-material having its major surface area removed. If that is done by distinct areas of, for example triangular shape, as shown, a grid of ribs is obtained which rest on the inner layers to support the outermost layer 64 of fabric, which is metallized on both sides. It can be seen that wide areas between barrier 62 and fabric layer 64 remain open. Since they are located externally of the main vacuum barrier 62, and furthermore due to the permeability of fabric 64, which may be enhanced by providing apertures 68, the volume enclosed will communicate with outer space. This fact significantly contributes to the radiation and heat protective action of the outer shell, as defined by the three outermost layers 62, 64 and 66.

For the sake of completeness, FIG. 4 illustrates the fashion in which the multilayer shell is modified in the areas of the space suit which must accommodate a joint of the wearer's body, such as his knee. The internal portion including the cooling garment 12 and what has been termed the intermediate shell including felt layers 56 and 60 with the rubber layer 58 therebetween are unchanged, with the only difference that the flexibility and the loose fit of these layers are indicated by a slightly wavy configuration, as shown. Referring to the outer shell, it is modified to the extent necessary to provide flexibility. The main vacuum barrier 70 is here formed of fabric having its inner surface rubberized to provide a pressure-tight layer. The outside surface is aluminized to impart to this layer a maximum of reflectivity for infra-red radiation penetrating through the outermost layer of the shell which is a metallized fabric, suitably aluminized, on both sides. As shown in FIG. 4, the main vacuum barrier 70, made of flexible material as stated above, is folded to assume a configuration similar to that of a bellows, forming convolutions 72. The convolutions are separated one from another by ribs 74 which continue into nonmetallic stand-offs 76. It should be remembered that FIG. 4 is a longitudinal sectional view through, for example, a knee joint with layer 42 indicating the skin. Thus, a complete joint and space suit components covering it must be imagined to symmetrically encompass the knee; the axis though through a stretched knee is indicated by the dash-dotted line 78. Thus, the main vacuum barrier 70 actually forms a bellows-type sleeve and the separating ribs 74 have the shape of rings having their centers in the area of the symmetry axis 78. The stand-offs 76, which may also be perforated rings, support the outermost layer 64 which is a continuation of the layer 64 of FIGS. 2 and 3. As a matter of course, the main vacuum barrier 70 in the area of a joint such as that shown in FIG. 4 is sealed to that designated 62 in FIGS. 2 and 3. In this regard, it should be noted that a complete detailed description of an assembly for a space suit joint suitable for the purpose and designed for constant volume characteristics so that motion of the wearer is unimpeded, is described in U.S. Patent 3,242,499, issued March 29, 1966, entitled "Constant Volume Joint," and assigned to the assignee of the present invention.

Continuing now with the detailed description of the different components, the cooling garment, generally designated 12, as shown in FIG. 5 includes two layers 48 and 50 of any suitable fabric, preferably of porous nature, with a network of interconnected flexible tubes 52 made for example from plastic and sandwiched between both layers. Stand-offs 80 are arranged between the tubes 52, in the form of meandering strips of felt; cord or any other suitable material may also be used. It will be understood that FIG. 5 is a sectional view illustrating the manner in which the cooling garment is constructed. In fact, an entire system of tubes 52 throughout the cooling garment is required, and some of the design computation results will be given more below. At this point it should be mentioned that a circulatory system of tubes arranged in a garment for the purpose of cooling a wearer is disclosed in U.S. Patent 3,079,765 issued to Allan D. LeVantine on Mar. 5, 1963 and assigned to the assignee of the present invention. However, whereas LeVantine suggests evaporating the fluid contained in the system directly into outer space, the present invention provides a closed loop circulatory system in which the fluid is circulated and which system includes a heat exchanger. The heat exchanger is located in the cooling pack 14 of FIG. 1, and operates by the controlled evaporation of another cooling fluid, as shown in FIG. 6.

Referring now to FIG. 6, the heat exchanger may include a set of parallel cooling fins 82, made for example of sheet aluminum with two or more connecting walls 84 to form a rigid unit. Porous material 86, such as bibulous natural or artificial sponge, is disposed in the interstices between adjacent fins 82. Two sets of tubings, designated 88 and 90, extend through the system of cooling fins in such a manner that a fluid conveyed through tubings 88 and 90 is in thermal contact with the fins and thus with the spongy material 86. This is best accomplished by arranging the tubes 88 and 90 in vicinity of lines of intersection of fins 82 with the connecting walls 84.

One of the sets of tubes, such as that designated 88, forms part of the closed loop circulatory conduit system which includes tubes 52 of the cooling garment. The bibulous material 86 is impregnated with a cooling fluid, suitably water, and the cooling fluid circulated through the closed loop system may be ethyl alcohol, a mixture of ethylene glycol and water, or any other fluid having a low freezing point and a reasonably high boiling point. By means described in detail in connection with FIG. 7 and the complete cooling pack, the circulating cooling fluid is driven through the tubes 52 of the cooling garment, through one of the connectors 92 in FIG. 1 into the cooling pack 14, through tubes 88 of the heat exchanger and through the other of connectors 92 back into the cooling garment. An identical second closed loop circulatory system is provided in a similar manner for driving cooled oxygen-rich gas or air through the space 54 formed between the cooling garment 12 and felt layer 56 of the intermediate shell of layers 56, 58, 60, using connectors 94 of FIG. 1.

The cooling system including the heat exchanger will be better understood from the flow and block diagram of FIG. 7 in which the main components of the system are illustrated. The body section of the space suit, composed of the upper and lower suit assemblies 10 and 20 is schematically indicated by the block 100. The head section or inclosure, the breathing pack and the cooling pack are designated 36, 26 and 14, respectively, in accordance with FIG. 1. In the body section 100 of the suit, there is shown an outer square which symbolizes the air space 54 surrounding the cooling garment. The network of tubings 52 in the cooling garment 12 is illustrated by two vertical lines with connecting wavy lines to indicate the meandering arrangement of tubes 52 throughout the cooling garment. Thus, the vertical line symbolizes the main tubes of the system which feed into parallel sets of tubings as for example explained in U.S. Patent 3,079,765 mentioned above.

Referring now to the cooling pack 14, this unit includes the heat exchanger 102, and all of the components required for driving the cooling fluid through the cooling garment 12 and also for driving an oxygen-rich gas through the air space 54. These components include a battery 104 driving a motor 106 which, in turn, drives both a blower 108 and a pump 110. The blower 108 forms part of one of the closed loop circulatory systems, and pump 110 forms part of the other system. As shown in FIG. 7, the pump 110 pumps the liquid coolant into the heat exchanger and through one of the sets of tubes of FIG. 6, symbolized by the wavy line 88 in FIG. 7 within the heat exchanger 102. Through conduit 112 and one of the connectors 92 (also shown in FIG. 1), the cooling fluid is pumped into the tubing system 52 of the cooling garment 12 as indicated by the connection of conduit 112 with the left-hand side vertical main conduit which distributes the inflowing fluid over the system of tubes 52. The fluid is collected again in the right-hand side main conduit and returned to the pump 110 through conduit 114 extending through the other of connectors 92. A bypass valve 115 for the cooling fluid is provided so that the wearer may regulate the cooling action without actually stopping the cooling mechanism for the cooling garment.

The other closed loop circulatory system, providing ventilation and also cooling by convection of the inner suit portion, operates in a similar manner. Blower 108 drives a gas, suitably oxygen-rich air, through conduit 116, the other set of tubes 90 of heat exchanger 102, conduit 118 which includes a water trap 120 and an odor trap 122, through one of connectors 94 into the air space 54 surrounding the cooling garment.

It will be seen that the air, or other oxygen-rich gas, forms a second complete closed loop system. The air present in the system when the suit is donned is considered sufficient for the purpose involved. However, it will be remembered that the intermediate shell, composed of layers 56, 58 and 60, and also the outer shell including layers 62, 66 and 64 must of necessity terminate at the neck seal 32. From that it might appear that the space within the head inclosure communicates with space 54 through which air is circulated by the closed loop system described under the action of the blower 108. However, this is not the case. It was found that the weight of the suit automatically provides pressure in the area of the shoulders so that the head inclosure 36 and the portions surrounding the seal 32, 34 directly rest upon the underlying layers. Even though, of course, no perfect sealing action can be obtained, the separation of space 54 from the head section 36 which is supplied with oxygen from the breathing pack 26 is sufficient for the present purposes. On the other hand, it will be appreciated that a leakage of some oxygen-rich gas from the head section 36 into space 54 may be desirable. Under any circumstances, insignificant leakage cannot reach proportions to interfere with the proper circulation of gas in either of the sections. This fact is important because, as shown in FIG. 7, the head section 36 is supplied with breathable oxygen-rich gas from breathing pack 26, through conduits 124 and 126, thus forming a third closed loop circulatory conduit system.

At this point it should be mentioned that it is contemplated that the water accumulating in the water trap 120 may be used to replenish the water contained in the sponge material 86, so that the duration of a mission may be extended. This may be accomplished by closing valve 128 and then mechanically forcing fluid from trap 120 to zone 86, by a plunger or the like. Solar batteries may be used for recharging batteries 104, and it is intended to initially maintain the batteries of the suit in a charged state by plugging them into the power supply of the space ship, so that they are fully charged when needed.

Returning to the cooling pack 14 and the heat exchanger 102 shown in detail in FIG. 6 and forming part of the cooling pack 14, as shown best in FIG. 7, it has been stated above that the heat exchanger operates through controlled evaporation of a cooling fluid contained within the bibulous material 86. For this purpose, and still referring to FIG. 7, a port provided with an adjustable vent 128 permits evaporation of the water in the bibulous material into outer space. Although, for the sake of simplification, this and other vents are symbolized by a slide valve, any other type of valve may be employed. The important fact to be emphasized is that cooling the fluid pumped through the cooling garment 12 and the gas driven through the space 54 surrounding the cooling garment is accomplished in a manner readily controlled by a wearer of the suit, without the use of intricate servo systems including thermostats and moving components exhibiting a comparatively high tendency toward failure.

Considering the likelihood that the cooling pack will experience extremely low temperatures at least during a portion of the duration of a mission in outer space, it was found desirable to encompass the cooling pack 14 with a triple-layer shell similar to that in the three layer "outer shell" of the suit, described above. It includes, from inside to outside, a layer of sheet metal such as polished aluminum, stand-off arrangements such as the apertured felt-layer, and a layer of fabric which is metallized, suitably aluminized, on both sides. This triple layer outer shield, mentioned above when discussing FIGS. 2 and 3, where the layers are designated 62, 66 and 64, respectively, forms a shield for protection against impinging radiation, as discussed further below. However, and as a more important feature, the adjustable vent 128 may readily be mounted in such a manner that it is in heat-exchanging relationship with the aluminum sheet layer 62 which also forms the main vacuum barrier. It will be seen that when the layer 62 is in heat conductive relationship with the vent 128, or the valve seat of an equivalent device, this portion will be maintained at a temperature close to normal body temperature by heat convection, so that freezing of the vent or valve is effectively prevented even under the coldest conditions that can be expected. The specific arrangement of elements for conducting heat toward the valve is, in principle, identical with that employed in the breathing pack 26 for cooling the breathable oxygen-rich gas supplied to the head section 36 as discussed below in connection with FIG. 8. The port for evaporation of the cooling fluid in the breathing pack 26 with another slide valve 130 is shown in FIG. 7 for completeness.

Referring now to the breathing pack 26 in particular, this unit is designed in accordance with principles well known in the art of protective clothing such as suits for miners, cold suits, and so forth. More particularly, the breathing pack includes a motor driven blower, oxygen tanks, a carbon dioxide remover, a water trap and controls, valves and other elements required in a complete recirculating system providing a breathable atmosphere within the head section 36.

It will be understood that the recirculating system including the breathing pack 26, the head section 36 and conduits 124, 126 constitutes a third closed loop circulatory system, in addition to the two systems described above, referring to the systems cooling the body section by means of heat exchanger 102. Since intense heat due to impinging radiation under hottest conditions in outer space must necessarily be produced within the breathing pack 26 and within the head section 36, both are also provided with cooling mechanisms of the type using controlled evaporation into outer space of a cooling fluid, suitably water. Schematic cross sections through the breathing pack enclosure and the head section shell are shown in FIGS. 8 and 9, respectively.

Referring now to FIG. 8, an internal empty space labelled "Breathing Pack Compartment" is intended to receive the unit supplying oxygen-rich gas to the head section. As mentioned above, it includes the components necessary for this purpose as well known in the art and a detailed description of the breathing pack 26 is omitted herein. As shown, the breathing pack compartment walls also form a multilayer shell which includes a cooling arrangement for maintaining the entire unit at a low temperature even when exposed to intense radiated energy. Three consecutive metal walls are shown, with aluminum being the preferred metal in almost every instance referred to throughout the entire description of the life support system disclosed herein, for its light weight and other properties. The innermost aluminum sheet wall 132, in cooperation with the adjacent wall 134 and separation strips 136, similar to those shown at 80 in FIG. 5, forms a cooling duct through which the breathable atmosphere is pumped before it is admitted into the head inclosure of section 36. The outer surface of aluminum wall 134 is covered with a layer of bibulous material 138 of the type used in heat exchanger 102 and referred to in connection with FIGS. 6 and 7. In operation, the spongy material is impregnated suitably with water which is allowed to evaporate into the space defined between the sponge and the third aluminum wall 140, through the sliding valve 130 (also shown in FIG. 7) and into outer space. Stand-offs 66 and an outermost layer of fabric metallized on both sides, both of which are identical with those forming part of the outer shell of the space suit proper as discussed in connection with FIGS. 2 and 3, complete the multilayer shell enclosing the breathing pack.

It will be understood that a cooling action is achieved by rapid evaporation of water contained in the bibulous material 138. The rate of evaporation is readily controlled by the wearer of the space suit. In this respect, the cooling system for the breathable atmosphere constitutes a heat sink operative in a manner similar to that in which the heat exchanger 102 of FIG. 7, shown in detail in FIG. 6, acts to dissipate heat conveyed by the cooling fluid of the cooling garment and the gas flow around the cooling garment. As a matter of course, the cooling action of either of the systems may be controlled, and even completely stopped, by adjusting or entirely closing the adjustable vents 128 and 130.

It has been pointed out above that it was found advantageous to provide heat convection from the wearer's body, through one of the metallic layers toward the vent, or valve seat, in order to prevent freezing of the valves under extremely cold conditions. In connection with FIG. 7, it was mentioned that the sliding valve 128 is suitably mounted in a heat exchanging relationship with the aluminum layer forming an outer layer of the multilayer shell encompassing the cooling pack. In a similar manner, as shown in FIG. 8, sliding valve 130 is in heat exchanging relationship with the outermost aluminum wall 140. A number of metallic ribs 141 forming a good path for heat flow connect the wall 140, through the spongy material 138, to the inner wall 132 which, in turn, rests upon the aluminum sheet layer 62 referred to in connection with FIGS. 2 and 3, in the chest region of the upper suit assembly 20. Thereby, heat transfer by conduction is ensured to a sufficient extent to prevent freezing of the valve 130 (FIGS. 7 and 8) and valve 128 (FIG. 7). For completeness, FIG. 8 also shows one of the connectors, designated 24, see FIG. 1, through which the breathable oxygen-rich atmosphere is directed toward the head section 36, or passed from the head section into the breathing pack 26.

Concerning the head inclosure or section 36, it has been stated above that it forms a separate component of the space suit. Accordingly, separate heat control and protection from extreme cold are necessary requirements if the astronaut is to accomplish his mission. As discussed above, some of the heat imparted by the human metabolism to the recirculating atmosphere can be dissipated, at a controlled rate, into outer space by evaporation of water contained in the spongy material 138 through sliding valve 130 which controls the rate of evaporation. Computations of the heat balance have shown that the cooling effect will be insufficient under extremely hot conditions. Accordingly, a complete life support system in accordance with the invention may include a heat sink type cooling mechanism for the head inclosure, and a structure designed for this purpose is shown in cross section in FIG. 9.

Referring now particularly to FIG. 9, it should be mentioned in the first place that the shape of the entire head section is of secondary importance. Even though a basically spherical shape such as that shown in FIG. 1, may be preferred, a cubic or other arrangement of walls intersecting one another at suitable angles could be used. Thus, the cross sectional view of FIG. 9 is to be understood as a schematic showing rather than a cross section through an embodiment.

The head inclosure, as shown in FIG. 9, also takes the form of a multilayer shell quite similar to that of the body section, combined with a heat sink type cooling mechanism of the kind used for cooling both the breathing pack 26 and the cooling pack 14. The innermost portion within the head section is the protective helmet 40 (FIG. 1), which is in fact an independent component and not attached to the head section. It is shown as the lowermost, internal layer in FIG. 9 only for the sake of completeness. The head inclosure proper rests upon the neck seal by which it is connected to the upper suit assembly, and therefore on the shoulders of the wearer, so that ample space 142 is left between the helmet 40 and the insulating layer 56 of felt-type material forming the innermost layer of the head inclosure. The subsequent layer 58 is a rubber sheet forming the emergency vacuum barrier, both layers 56 and 58 being in conformity with the arrangement in the shell of the body section (FIGS. 2 and 3). The subsequent layer 144 is made of aluminum sheet. It will be observed that, in the head section, it was found that the second insulating layer 60, present in the body section, may be omitted. It will be clear that the aluminum sheet layer 144 assumes the function of the main vacuum barrier. The main vacuum barrier 144 is enclosed in a layer of spongy material 146, impregnated with water when in operation or prepared for action, in close analogy to the cooling mechanism for the breathing pack 26. As shown, and also in similarity with the breathing pack enclosure, the outermost portion is a three-layer shell corresponding to the identical shell of FIGS. 2 and 3. It includes the aluminum sheet layer 62, stand-offs 66 and aluminized fabric outermost layer 64, termed the outer shell in connection with FIGS. 2 and 3. Heat conveying ribs 141, similar to those of the breathing pack (FIG. 8) are also used, to assist in preventing freezing of the valves 148, 150.

The aperture for controlled evaporation into outer space of the water contained within the bibulous material 146 is illustrated, in FIG. 9, as a valve 148 with conical seat 150, to show that this type of regulator may be used instead of the sliding valve type of construction as shown at 128 and 130 in FIGS. 7 and 8, respectively. Here again, the valve seat 150 is shown in intimate, thermal contact with aluminum layer 62, and heat-conductive ribs 141 assist in maintaining the temperature above the freezing point through heat conduction from inside the head inclosure toward the valve seat 150; thus, freezing of the valve is prevented even under coldest conditions. It will be seen that the principle is the same as that applied with respect to regulating valve 130 controlling the breathing pack temperature (FIG. 8), as well as valve 128 controlling the rate of water evaporation from the heat exchanger 102.

In addition to the arrangement described to this point, an additional cover 151 for the area of the valve 148 is illustrated in FIG. 9. This cover is constructed in a manner identical with the outer shell, i.e. it includes three layers 62, 64 and 66 which are aluminum sheet, aluminized fabric and the stand-off felt layer. It will be understood that this additional cover is comparatively small and extends only over the immediate surroundings of the valve 148. Heat-conductive ribs 153 act as the support for the cover and also provide a path for heat flow between the aluminum layers designated 62, to indicate that the cover 151 is constructed in a manner identical with that of the outer shell 62, 64, 66. An identical cover 151 may be employed to further protect valves 128 and 130 of the breathing pack assembly of FIG. 8, and the cooling pack of FIG. 7, respectively.

Summarizing the main features of a complete thermal and respiratory life support system as discussed to this point, it will be remembered that these features include the cooling garment 12 through which coolant flows to form a closed loop circulatory system. The coolant flow traverses the intermediate felt-type material layers 56 and 60 with the intermediate rubber sheet 58, forming the main thermal barrier of the system, and passes through the heat exchanger 102. A second closed loop system provides oxygen-rich gas within the space 54 and also circulates it through the thermal barrier into the heat exchanger. Both of these parallel, closed loop systems cooperate, either singly or combined, to dissipate, at a controlled rate, into space the heat conveyed in either of them. The heat exchanger operatively coupled to these closed loop circulatory systems suitably includes conduits in thermal contact with a set of cooling fins, and bibulous material arranged between the cooling fins for impregnation with water, for example, the controlled evaporation of the water operating to cool both of the cooling fluids in these two parallel closed loop systems. A third, independent closed loop system provides a circulating flow of a breathable atmosphere from the breathing pack 26 into the head inclosure, and both the breathing pack and the head inclosure are maintained at comfortable temperatures by heat sinks operating on the same principle of controlled evaporation of a fluid, suitably water, contained in bibulous material arranged in the enclosure walls of the breathing pack compartment and the head inclosure. Heat conducted from inside the space suit may be applied to prevent freezing of the valves controlling the rate of evaporation in any or all of the heat sinks.

Now that the essential features of the structures involved have been discussed and their mode of operation has been explained, it appears appropriate to consider in some detail the selection of certain preferred materials with respect to their merits in the entire system. Some computation results of heat balance calculations and dimensional information with respect to some of the components are also given further below in order to show that the life support system, in fact, meets the requirements for survival and comfort to the extent possible under outer space conditions.

First, the three outermost layers in the body section, the head section, the breathing pack, and the cooling pack will be considered. It will be remembered that these layers, designated 62, 64 and 66 throughout this text, have been termed "the outer shell" to indicate, in accordance with another essential feature of this invention, that they form an operative unit. As mentioned above, the sheet metal, preferably aluminum, layer 62 acts as the main vacuum barrier in the body section of the space suit, i.e. the upper and lower suit assemblies 20 and 10, respectively (FIG. 1). Considering that the provision of an aperture in the form of an adjustable valve is necessary in the cooling and breathing packs and in the head inclosure, the layer 62 does not act as the main vacuum barrier in these areas.

The essential effect achieved by the specific combination of the three layers 62, 64 and 66 resides in the fact that they cooperate to form the main thermal barrier of the system. They afford protection from impinging radiated energy, a condition which is encountered when the astronaut is exposed to full sunlight without attenuation by an atmosphere, as expected on the lunar surface facing the sun.

In order to discuss the specific selection of materials and the physical arrangement in the outer shell composed of layers 62, 64 and 66, reference is made to FIG. 10 which is an idealized diagram of the absorptivity characteristics of the materials selected versus the temperature producing the radiation impinging on the material. Two considerations should be put into the foreground when facing the problem of radiation protection: First, it is desirable to equip the space suit with a highly reflective material for the type of radiation involved. Second, metals must be considered for their reflectivity and mechanical strength, and aluminum is the preferred among them because of its low cost, light weight and corrosion resistance. Although there is no reason why aluminum may not be replaced by another metal such as magnesium or beryllium, the following considerations deal mainly with aluminum. As a further important point, the term "reflectivity," for the present purposes, is meant to define diffuse reflectivity, since reflection into outer space of impinging radiation is of interest here, regardless of the angle of direction into which reflection occurs.

Referring now specifically to the diagram of FIG. 10, there are shown the absorptivity characteristics of the materials discussed herein. This diagram is a slightly modified version of a diagram found in Marks Mechanical Engineer's Handbook, 6th Edition, Theodore Baumeister, editor, published by McGraw-Hill, New York. The diagram of FIG. 10 is shown in two fragments to include radiation temperatures in the neighborhood of that of the human body, and also of the estimated solar radiation temperature. Two characteristics are shown: one for polished aluminum and one for aluminized fabric designated 152 and 154, respectively. With respect to the latter, the Handbook refers actually to aluminum paint, as also indicated in FIG. 10. Even though the outermost layer 64 of the space suit may be of aluminum painted material, aluminized fabric is preferred. However, since both are poor conductors of electricity and otherwise show similar behavior, it can safely be assumed that the characteristics for aluminum paint and aluminized fabric coincide sufficiently for the purpose of the present discussion.

It will be apparent from the right-hand side of the diagram of FIG. 10, that in the region of solar radiation temperature aluminized fabric 154 exhibits a lower absorptivity than a polished aluminum surface 152. It will be remembered that reflectivity changes inversely with absorptivity. Consequently, an aluminized fabric has better reflectivity properties than polished aluminum. This surprising statement becomes acceptable as a fact when remembering we are considering diffuse reflectivity, so that the mirror-like behavior of polished aluminum has little bearing on the figures. As a further point, the high electrical conductivity of polished aluminum has a bearing on the absorptivity-reflectivity characteristics, and the fact that aluminized fabric is a poor conductor must be accounted for by the comparatively high reflectivity of this material in the region of solar radiation.

It has been stated above that the outermost layer 64 is made of fabric which is aluminized on both sides. While the reflectivity properties justify the fact that the outer side of the outermost layer is made of aluminized fabric for minimized radiant energy absorption and high reflectivity, more consideration must be given to the inner aluminized surface. It is known that the emissivity of a material is a direct function of its absorptivity. As seen from characteristic 154 of FIG. 10, an aluminized fabric, although exhibiting low absorptivity characteristics in the range of high temperature radiation, has an absorptivity higher than that of polished aluminum and, therefore, also higher emissivity in the area of lower temperature radiation. It will be understood that, with solar radiation impinging upon the outer aluminized surface, some of the energy will be reflected into outerspace, and thereby not contribute to a temperature increase on the surface. The remainder of radiated energy is absorbed in the layer and, since the layer is not transparent to a significant extent, transformed into heat energy. Due to its higher emissivity at lower temperatures, the inner aluminized fabric surface will radiate some of this infra-red energy inwardly with respect to the space suit. At this point it should be mentioned, that heat balance computations have indicated that with the design parameters selected for a protype space suit, the temperatures at the aluminized fabric surface will reach a minimum of −58° F. when shadowed in space, and of about 170° F. when in full sunlight on the moon surface. FIG. 10 shows that in this range, even at 170° F., aluminized fabric, now referring to the internal surface, will have considerable absorptivity and therewith emissivity, so that a significant portion of absorbed energy will be emitted inwardly from the inside surface of layer 64.

At this point, the two subsequent layers 62 and 66 enter into consideration. It has been stated that stand-off layer 66 is made of low thermal conductivity material such as felt, and apertured to minimize heat transfer. Since the aluminized fabric of layer 64 is permeable, and may have orifices 68 (FIG. 3) to increase its permeability, heat transfer by conduction is reduced to a minimum when the apertures between the stand-off ribs of felt layer 66 are comparatively great. The rib surface contacting either of the adjacent layers 62 and 64 may be about 10 percent of the total surface. The infra-red radiation emitted by the internal aluminized fabric surface of layer 64, or most of it, reaches the outward surface of the aluminum sheet layer 62. As stated above, this surface is polished, and the absorptivity characteristic 152 of polished aluminum shown in FIG. 10 should be understood for the realistic approach of a polished aluminum surface on which the inevitable thin oxide layer has previously formed. The low absorptivity of such polished aluminum surface in the region of low temperatures, as shown in the left-hand side of FIG. 10, is also indicative of high reflectivity for incident radiation emanating from a surface at a temperature in this range. Accordingly, an essential component of infra-red radiation originating from the inner aluminized fabric is reflected by the polished aluminum surface outwardly with respect to the space suit.

The effect of the combination of the three layers 62, 66, 64, which are the polished aluminum surface, the aluminized fabric and the substantial vacuum, as expressed in terms of structure by being formed between the standoff ribs and due to the permeability of the aluminized fabric, may be understood as an action of splitting impinging radiated energy into two fractions of different levels, with the outer aluminized surface reflecting substantial amounts of high temperature radiation in the visible spectrum, and the polished aluminum surface of layer 62 reflecting substantial amounts of lower temperature radiation in the infra-red spectrum. When applying this statement to the characteristics 152 and 154 of the diagram of FIG. 10, it will be seen that each of the layers is used in accordance with its specific properties in one or the other range of the spectrum. In this respect, it can be shown that the specific outer shell structure has a protective power to such extent that the main vacuum barrier, which is the aluminum sheet layer 62, is subjected to a temperature range of only 33° F. to 90° F. when in heat exchanging relationship with the remaining suit components and when experiencing extreme cold and hot conditions expected on a mission in outer space. Thus, the outer shell operates as a radiation barrier, in addition to its other functions mentioned above.

Some of the heat balance computations made when designing the life support system of this invention are closely related to the qualitative deductions of the foregoing paragraphs. In order to obtain an estimate of the temperatures which the outermost layer of the space suit will experience, two pieces of information are needed. They are: the maximum amount of heat which can be exchanged with the surroundings commensurate with the suit's own cooling system, as described above; and the radiant energy incident upon the suit from the exterior. The latter can be obtained from a number of data of astro-physical character such as the solar radiation constant, the heat radiated from the moon surface etc., all of which are sufficiently known for the present purpose. In addition, the radiation characteristics of the suit surface materials must be considered, as given for aluminized fabric in FIG. 10. The heat exchange properties of the suit being a function of its design are readily determined, and a series of trial calculations have indicated that the maximum amount of heat exchange which should be allowed between a human body and the surroundings directly through the suit wall, disregarding the action of the cooling garment, is about 20 B.t.u./hr. ft.$^2$ in either direction. These quantities, constants and design parameters have been used to calculate the temperatures to which the outer layer 64 of the suit will come under extreme hot and cold conditions. The result of 170° F. in the first case, and −58° F. in the latter case has been mentioned above. These two figures are a specific result of the maximum heat exchange allowed, i.e. 20 B.t.u./hr. ft.$^2$ combined with the absorptivity-reflectivity properties of the material selected as that of the outermost layer, aluminized fabric in the present instance. It is important to note that the extreme temperatures of 170° F. and −58° F. embody a specific feature of the invention inasmuch as the arithmetic average or mean of 170 and −58 is 56. A temperature of about 56° F. is on the order of magnitude of normal body temperature, which is about 98.6° F. Preliminary calculations have revealed that in a system in which the mean temperature at the outermost surface, defined as the average value between the temperatures under extreme hot and cold conditions, substantially deviates from normal body temperature, design parameters are obtained which either result in extremely bulky heat insulation (referring for example to the felt-type layers 56, 60), or the cooling garment system cannot be designed sufficiently powerful to dissipate into outer space the heat quantities expected without becoming prohibitively cumbersome and heavy. Thus, it was found that optimum design conditions are obtained when the outermost surface 64 of the outer shell, the shell being defined as the functional unit reflecting impinging radiated energy, is made of a material having an absorptivity to radiated energy such that the mean temperature at said outermost surface is within the order of magnitude of normal body temperature when the space suit is in use. As shown and discussed above, fabric of any nature, when aluminized on both sides, especially in combination with a polished aluminum surface and a vacuum between them (as provided in practice by a heat-insulating, minimum area stand-off layer) meets the requirement for an average temperature when used in a space suit of the type contemplated herein.

It should be noted that metallized fabric, such as aluminized woven cotton material for specific example, is especially suited because it exhibits the absorption, reflection, and emission properties discussed above. In comparison, a black material would experience a lower maximum temperature under hot conditions, and a lower minimum temperature under cold conditions so that the average temperature would be below the order of magnitude of normal body temperature. While the lower maximum temperature under direct radiation conditions is somewhat contrary to our experience in atmospheric conditions, it is produced by the high radiating characteristics of a black surface in space. On the other hand, shiny material would assume temperatures of which the algebraic average is above this range. For completeness it should be noted that among the many materials investigated, anodized sheet metal behaves like a shiny body with respect to sunlight, but like a black surface with respect to infra-red radiation. It was found, that aluminized fabric, in fact, meets the requirement, as stated above. Other types of metallized fabrics or other materials having similar characteristics to those shown in FIG. 10 may be used to secure the average temperature criterion set forth above.

The description of the thermal and respiratory life support system to this point deals mainly with the cooling systems involved for protection from extreme heat. This is due to the comparatively complex cooling structure involved, as discussed above. As a matter of course, protection from extreme cold is by no means less important if survival and comfort of an astronaut are considered. It is one of the merits of the system developed herein that protection from cold is accomplished without using bulky and heavy heating devices. If certain conditions are met, adequate cold protection can be accomplished by the cooperation of all layers contributing to heat insulation. The thermal barrier of the system is the combination of the intermediate shell, which term includes layers 56 and 60, with or without the emergency vacuum barrier in the form of the rubber-sheet 58 between them and the outer shell. When designed in such a manner that about 20 B.t.u./hr. ft.$^2$ are radiated from the outer surface of layer 64 into space, the system is in thermal equilibrium under coldest conditions, i.e. no radiated energy is introduced. Then, and in other terms, the human body, by the metabolic heat which it produces constitutes the only heat source within the suit.

A better understanding of heat transfer through the different layers, or shells, of the suit under extreme conditions of heat and cold, and the basic principles involved will be better understood in connection with FIG. 11 which is an idealized diagram illustrating heat or energy transfer through the body section of a space suit under extreme conditions. It must be emphasized that the diagram of FIG. 11 is of qualitative nature and not to be interpreted as indicating actual magnitudes. The abscissa represents, in a somewhat distorted manner, the layers or components of the multilayer shell described in connection with FIGS. 2 and 3, for example, and the ordinate indicates temperature. Since FIG. 11 is of value only to qualitatively illustrate best transfer conditions, no specific scale may properly be applied to either of the axes of the diagram.

FIG. 11 shows in diagrammatic form extreme hot and cold conditions; the case of extreme cold will be considered first as the simpler case. Point A indicates body temperature at the skin surface, point B illustrates the temperature at the outermost surface, which is the outer surface of the aluminized fabric 64, and the arrow 160 indicates in a general way the temperature gradient through the shell. Under these condtions, the astronaut will keep the valve 128 (FIG. 7) closed to stop any cooling effect which might be produced by the cooling garment and ventilation system described above. The cooling garment, including the cooling fluid within the tubes 52 then assumes an intermediate temperature, and contributes to the entire shell as an additional heat-insulating layer. It is stressed again that the main contribution to heat-insulation is derived from the outer shell combined with the intermediate shell of felt-type material. Thus, the temperature gradient 160, although it connects points A and B, is in practice not a straight line. The important fact is that a human body produces heat at the rate of at least 20 B.t.u./hr. ft.$^2$ of skin, when at rest, the space suit contemplated herein affords sufficient protection from cold under the most adverse space conditions. In this respect, caculations have shown that with layers 56, 58, 60 made of wool felt, and having thicknesses in the range of about three-eighths of an inch, all of the requirements for sufficient protection are fulfilled, when an astronaut is subject to the heat loss conditions in outer space. More specifically, with 20 B.t.u./hr. ft.$^2$ leaving the suit by radiation, the temperature at the outermost layer 64 is $-60°$ F., the main vacuum barrier temperature is $+33°$ F. and the cooling garment 12 reaches a temperature of about $+70°$ F.

Turning now to discuss heat transfer under hottest conditions, it can be seen from FIG. 11 that the cooling garment 12 is the coolest portion in the suit. The thermal system, as illustrated now includes as heat sources not only the human body, with the skin again at the temperature level A (or in vicinity), but also the heat produced by impinging radiation which causes the temperature at the outermost surface to rise to point C. Due to the cooling action of the heat exchanger cooperating with the closed loop systems discussed above, heat is removed from the cooling garment 12 and dissipated beyond the outermost layer by the action of heat exchanger 102, as indicated by arrow 162. The two resulting temperature gradients from the skin to the cooling suit and from the outermost layer to the cooling suit are symbolized by arrows 164 and arrows 166, respectively. It will be noted that the outer shell, formed by layers 62, 66, 64, designated "radiation barrier," significantly contributes to the steepness of temperature gradient 166. It will be noted that the horizontally broken line 168 drawn through point A intersects the ordinate through B and C at a point D located at about the center of the distance from B to C, to indicate that the extreme temperatures represented by B and C have an arithmetic average in the vicinity of the temperature A≅D. Thus, the temperature at the skin, symbolized by the position of A, remains in an area of normal room completeness and within the limits of comfort for the wearer. Thus, calculations have shown that with 14.5 B.t.u./hr. ft.$^2$ entering the space suit from the surroundings as impinging radiated energy, the outermost surface of layer 64 will reach the temperature of 156° F.

However, the main vacuum barrier 62 is then at 90° F., and the cooling garment 12 is also at a temperature in vicinity of 70° F.

Some more detailed statements about the specific structure and its mode of operation will now be given to further enhance the understanding of the present invention.

The life support system as disclosed herein has been designed, and tests and calculations have been made to show that it will, in fact, permit an astronaut to perform a mission on the moon's surface for an average duration of four hours. The system does not require the astronaut to be encased in the space suit during normal take-off from the Earth's surface or the moon's surface. Rather, the space suit, ready for operation, is carried along and donned when the astronaut approaches or reaches his destination. Among many others, the "ready-to-go" conditions under which the space suit is stored include: a full oxygen supply and fresh carbon dioxide absorber in the breathing pack, maximum impregnation of the cooling systems bibulous materials with water, batteries charged, etc.

It has been shown that the weight and the volume of the entire system are within the allowable limits to meet all requirements for accomplishing a four-hour mission on the lunar surface, when designing a space suit in accordance with the underlying principles of this invention. More particularly, computations with respect to the main cooling system for the body section, have shown that sufficiently even cooling will be provided if the tubes 52 in the cooling garment 12 have an internal diameter of ¼ of an inch, are placed about 2 inches apart and about 100 feet of total tubing is used. The rate of flow of coolant in the garment may be 207 pounds per hour, and if ten parallel flow paths of tubings (FIG. 7) are employed, the liquid speed is about 3.5 inches per second. Referring to the heat exchanger, it is known that spongy material can easily be loaded with water to 50 percent by volume. A sponge whose volume is 336 cubic inches will therefore contain enough water for a four-hour mission at moderate work level, at which the metabolic body-heat-rate is estimated 900 B.t.u./hr.

When designing the heat exchanger 102 of FIGS. 6 and 7 in conformity with the requirements as roughly pointed out above, it is found that ten ¼ inch tubes 88 may be assigned to alcohol flow, as the preferred cooling fluid in the cooling garment 12, and ten ¼ inch tubes 90 are assigned to air flow. These tubes may be joined together by walls 84 of 0.030 inch aluminum sheet. The fins may be made of aluminum sheet of 0.010 inch thickness. The overall dimensions of the cooling fin unit as shown in FIG. 6 could be 14 inches x 10 inches x 2.4 inches. It was found that the maximum temperature drop which can occur between the tubes 88, 90 and the water-laden spongy material 86 is about 8° F. if the temperature is above the freezing point, and somewhat less if the temperature is below the freezing point. These temperature drops apply to the situation where the total heat load on the exchanger is 1200 B.t.u./hr.

Calculations of the electrical power needed to run the blower 108 and pump 110 (FIG. 7) indicate that about 13 watts are sufficient, and the total weight of the cooling pack including the housing, the heat-exchanger, the sponge, the blower-pump-motor assembly and batteries of the silver-cadmium type for supplying power, as required for more than the estimated four-hour mission, was found to be about 8.2 pounds. The water necessary for a mission of this duration, and computed for the average heat load of 1200 B.t.u./hr. would be about 4.5 pounds. From these computation results it can be seen that the cooling system as disclosed herein remains within reasonable weight limits and is dimensioned appropriately without being excessive.

For the sake of completeness it may be mentioned that similar considerations for the head inclosure 36 determined the estimated total weight, including the protective helmet and associated parts, to approximately 6.7 pounds. Further, the thickness of what has been termed the intermediate shell, composed of layers 56, 58 and 60, would be ⅜ of an inch, total weight for the body section including cooling and breathing packs, and the head inclosure is about 65 pounds. It will be remembered that this intermediate shell constitutes the main thermal barrier and with the dimensions indicated protects the astronaut from extreme cold, when assisted by the remaining suit shells.

As a further point, it should be noted that, under extremely cold conditions the water contained within the bibulous material used in the heat exchanging arrangements surrounding the breathing pack 26, the cooling pack 14 and the head inclosure 36 must be expected to turn into ice almost immediately. However, the operation of the system is not impeded by this fact, especially since freezing of the valves is avoided by the feature of conducting heat from inside the space suit toward the valves, as described above. Similarly, batteries within the cooling and breathing packs are also protected from extreme temperature conditions.

The heat conductive properties of the main vacuum barrier 62 forming a complete layer around the body of the wearer result in another beneficial effect worthwhile to be mentioned. It will be understood that, when exposed to sunlight impinging from one side, the other side of the suit is in its own shade. This would result in a considerable temperature difference between both sides of the suit. Here, computations have shown that with a thickness of between 20 and 40 mils of layer 62, the temperature difference between that of the one and the other side would be about 5° F., which is negligible.

It is to be understood that the above-described arrangements are illustrative of the application of the principles of the invention. Numerous other arrangements may be devised by those skilled in the art without departing from the spirit and scope of the invention. Thus, by way of example and not of limitation, the heat exchangers in any or all of the suit components may be operative in a manner other than that described herein. Thus, the cooling fluid in the cooling garment could be directly evaporated into outer space, at a controlled rate. Even though aluminum, felt and other materials have been mentioned, and form part of the preferred embodiment of the invention, other materials such as magnesium and glass wool may be used. It has already been pointed out that the type of valve employed is by no means critical.

Accordingly, from the foregoing remarks, it is to be understood that the present invention is to be limited only by the spirit and scope of the appended claims.

What is claimed is:

1. A space suit having a self-contained thermal control system, comprising:
    at least one internal heat-insulating shell;
    a closed loop conduit system within said shell and including a cooling fluid;
    means for circulating said fluid through said system;
    an outer shell including first and second successive layers and means intermediate said layers to maintain a separation therebetween, said first layer forming an outermost shield and being made of fabric metallized on both sides, sheet metal having an outer polished surface forming said second layer, said outer shell forming a protective radiation barrier between outer space and the components encompassed by it; and
    means including said cooling fluid and a heat exchanger connected to said closed loop system and mounted externally of said outer shell for conveying heat from inside said internal shell to dissipate it into the space surrounding the thermal control system.

2. A thermal insulator comprising:
    a first layer of permeable fabric aluminized on both sides;
    a second layer of aluminum sheet; and
    a separating layer between first and second layer, said separating layer being formed of insulating material having its major surface area forming ribs which act as spaced stand-offs between said first and second layers.

3. In a space suit, an outermost shield for providing optimum protection from both excessive and lack of incident thermal radiation under extreme space conditions, said shield including outer and inner layers and a stand-off member intermediate said layers to maintain a separation therebetween, said outer layer including a permeable fabric metallized on both sides, said inner layer being formed of polished sheet metal.

4. A space suit comprising a composite outer shell formed by an outermost layer of fabric including a plurality of spaced apertures in said fabric and having its outer surface aluminized to provide a low-absorption surface with respect to incident high-temperature radiation, the inner surface of said fabric being also aluminized to emit a portion of infrared radiation as produced by absorption of said incident high-temperature radiation, an inner layer of polished aluminum for partially reflecting in an outward direction said infrared radiation, and stand-off means for separating said outermost fabric layer from said polished aluminum layer to form an interspace therebetween, said interspace communicating with outer space through apertures in said fabric.

5. A self-contained thermal control system for space suits, comprising a multilayer shell including:
    an inner cooling garment provided with a closed loop circulatory conduit system including conduits containing a first cooling fluid and means for circulating said fluid through said conduits;
    an intermediate heat-insulating shell encompassing said inner cooling garment and composed of two layers of felt-type insulating material with a continuous layer of resilient material between them to form an emergency vacuum barrier;
    a main vacuum barrier of sheet metal encompassing said inner cooling garment and said intermediate heat-insulating shell;
    an outermost shield encompassing said inner cooling garment, intermediate heat-insulating shield and main vacuum barrier; and
    means for conveying heat away from a wearer's body through said intermediate shell, said vacuum barrier and said outermost shield, said means including a heat exchanger having a second cooling fluid and mounted outside said shield and coupled to said conduits to receive said first cooling fluid and operative by evaporation of a second cooling fluid for dissipating excess heat into space around said thermal control system.

6. A self-contained thermal life support system for extravehicular space environments, comprising:
    a cooling garment provided with a closed loop circulatory conduit system including a plurality of conduits, a first cooling fluid and means for circulating said fluid through said conduits;
    a heat-insulating shell surrounding said cooling garment, and including a metallic layer; and
    a heat exchanger including a second cooling fluid arranged outside said insulating shell operatively coupled to said closed loop circulatory system for cooling said first cooling fluid;
    said heat exchanger including a plurality of heat conductive fins, conduits for said first cooling fluid in thermal contact with said fins, bibulous material for impregnation with said second cooling fluid disposed between adjacent fins, and adjustable valve means for causing controlled quantities of said second cooling fluid to evaporate into the space surrounding the life support system, said valve means being in thermal contact with said metallic layer to prevent, under extreme cold conditions, freezing of said second cooling fluid in vicinity of said valve means by conducting heat from a wearer's body toward said valve.

7. A self-contained thermal life support system for extravehicular space environments, comprising a multilayer shell including:

an inner cooling garment provided with a first closed loop circulatory conduit system including a plurality of conduits comprising a first set of tubes and a first cooling fluid in said tubes;

an oxygen-rich gas;

an intermediate heat-insulating shell spaced from and enclosing said cooling garment comprising a second set of tubes adapted to receive said gas to define a second closed loop circulatory conduit system and composed of two layers of felt-type insulating material with a continuous layer of resilient material between them to form an emergency vacuum barrier;

a main vacuum barrier made of sheet metal encompassing said inner cooling garment and intermediate said heat-insulating shell;

stand-off means in juxtaposition with said main vacuum barrier including an apertured layer of felt-type material;

an outermost shield spaced from said vacuum barrier by said stand-off means; and means for conveying heat away from a wearer's body through said multilayer shell and said outermost shield, said means comprising a heat exchanger mounted outside said outermost shield and including a plurality of heat-conductive fins in thermal contact with first and second sets of tubes and a second cooling fluid, said first tube set being coupled to said conduits to receive said first cooling fluid, said second tube set being connected to the space formed between said cooling garment and said intermediate heat-insulating shell to receive said gas, means for driving said first cooling fluid through said first closed loop conduit system and said first tube set, means for driving said oxygen-rich gas through said space and through said second tube set, bibulous material for impregnation with said second cooling fluid disposed between adjacent fins, and adjustable valve means for causing controlled quantities of said second cooling fluid to evaporate into the space surround the life support system.

8. A self-contained thermal life support system for extravehicular space environments, comprising a multilayer shell including:

an inner cooling garment provided with a first closed loop circulatory conduit system including a plurality of conduits comprising a first set of tubes and a first cooling fluid in said tubes;

an oxygen-rich gas;

an intermediate heat-insulating shell spaced from and enclosing said cooling garment comprising a second set of tubes adapted to receive said gas to define a second closed loop circulatory conduit system and composed of two layers of felt-type insulating material with a continuous layer of resilient material between them to form an emergency vacuum barrier;

a main vacuum barrier made of sheet metal encompassing said inner cooling garment and intermediate said heat-insulating shell having its outer surface polished for reflecting infrared radiation;

stand-off means in juxtaposition with said main vacuum barrier including an apertured layer of felt-type material;

an outer shield spaced from said vacuum barrier by said stand-off means; and means for conveying heat away from a wearer's body through said multilayer shell and said outer shield, said means including a heat exchanger mounted outside said shield and including a plurality of heat-conductive fins in thermal contact with first and second sets of tubes and a second cooling fluid, said first set of tubes being coupled to said conduits to receive said first cooling fluid, said second set of tubes being connected to the space formed between said cooling garment and said intermediate heat-insulating shell to receive said gas, means for driving said first cooling fluid through said first closed loop conduit system and said first set of tubes, means for driving said oxygen-rich gas through said space and through said second set of tubes bibulous material for impregnation with said second cooling fluid disposed betwen adjacent fins, and adjustable valve means for causing controlled quantities of said second cooling fluid to evaporate into the space surrounding the life support system;

said outer shield being made of fabric having both sides metallized to produce an absorptivity-diffused reflectivity characteristic with respect to radiated energy such that, when the outer metallized fabric surface is in heat-exchanging relationship with a human body wearing the space suit, at one side, and impinging radiated energy, at the other side, the mean temperature at said surface, as defined as the algebraic average of its temperatures at extreme hot and cold conditions, is within the order of the magnitude of normal body temperature.

9. A self-contained thermal and respiratory life support system for extravehicular space environments, comprising a space suit composed of a body section and a head section, said body section being essentially a multilayer shell including:

an inner cooling garment provided with a first closed loop circulatory conduit system including a plurality of conduits comprising a first set of tubes, a first cooling fluid in said tubes, and means for circulating said fluid through said conduits;

an oxygen-rich gas;

an intermediate heat-insulating shell spaced from and enclosing said cooling garment comprising a second set of tubes adapted to receive said gas to define a second closed loop circulatory conduit system and composed of two layers of felt-type insulating material with a continuous layer of resilient material between them to form an emergency vacuum barrier;

a main vacuum barrier made of sheet metal encompassing said inner cooling garment and intermediate said heat-insulating shell having its outer surface polished;

stand-off means in juxtaposition with said main vacuum barrier including a layer of felt-type material having its major surface area removed to form grid of ribs;

an outermost shield spaced from said vacuum barrier by said stand-off means made of permeable fabric metallized at both sides; and means supported by said body section for conveying heat away from a wearer's body through said multilayer shell, said means including a first heat exchanger mounted outside said outermost shield and including a plurality of heat-conductive fins in thermal contact with first and second set of tubes and a second cooling fluid, said first tubes being coupled to first closed loop conduit system, said second tube set being connected to the space formed between said cooling garment and said intermediate heat-insulating shell to receive said gas, means for driving said first cooling fluid through said first closed loop conduit system and said first tube set, means for driving said oxygen-rich gas through said second closed loop system and through said second tube set, bibulous material for impregnation with said second cooling fluid disposed between adjacent fins, adjustable valve means for causing controlled quantities of said second cooling fluid to evaporate into the space surrounding the life support system to cool said first cooling fluid and said oxygen-rich gas, as they are driven through said first and second closed loop circulatory systems, respectively;

means also supported by said body section for supplying breathable oxygen-rich gas to said head section and including a plurality of conduits, a supply of breathable oxygen-rich gas, and means for circulating said gas through said conduits; and at least one additional heat exchanger including a third cooling fluid operatively associated with said third closed loop conduit system for cooling said oxygen-rich gas by means of controlled evaporation of said third cooling fluid into the space surrounding the life support system.

10. A self-contained thermal and respiratory life support system for extravehicular space environments, comprising a space suit composed of a body section, and a head section, said body section being essentially a multi-layer shell including:

an inner cooling garment provided with a first closed loop circulatory conduit system including a plurality of conduits comprising a first set of tubes and a first cooling fluid in said tubes;

an oxygen-rich gas;

an intermediate heat-insulating shell spaced from and enclosing said cooling garment comprising a second set of tubes adapted to receive said gas to define a second closed loop circulatory conduit system and composed of two layers of felt-type insulating material with a continuous layer of resilient material between them to form an emergency vacuum barrier;

a main vacuum barrier made of sheet aluminum encompassing said inner cooling garment and intermediate heat-insulating shell having its outer surface polished;

stand-off means in juxtaposition with said main vacuum barrier including a layer of felt-type material having its major surface area removed to form a grid of ribs;

an outermost shield spaced from said vacuum barrier by said stand-off means made of permeable fabric aluminized on both sides; and means supported by said body section for conveying heat away from a wearer's body through said multi-layer shell, said means including a first heat exchanger including a plurality of heat-conductive fins in thermal contact with first and second sets of tubes and a second cooling fluid, said first tubes being coupled to said first closed loop conduit system, said second tubes set being connected to the space formed between said cooling garment and said intermediate heat-insulating shell to receive said gas, means for driving said first cooling fluid through said first closed loop conduit system and said first tubings set, means for driving said oxygen-rich gas through said second closed loop system and through said second tube set, bibulous material for impregnation with said second cooling fluid disposed between adjacent fins, adjustable valve means for causing controlled quantities of said cooling fluid to evaporate into the space surrounding the life support system to cool said first cooling fluid and said oxygen-rich gas, as they are driven through said first and second closed loop systems, respectively;

means also supported by said body section for supplying breathable oxygen-rich gas to said head section and including a plurality of conduits, a supply of breathable oxygen-rich gas, and means for circulating said gas through said conduits; and a second heat exchanger associated with said third closed loop conduit system including a third cooling fluid, a bibulous material impregnated with said third cooling fluid, and adjustable valve means for causing controlled evaporation of said third cooling fluid also into the space surrounding the life support system.

References Cited

UNITED STATES PATENTS

| | | |
|---|---|---|
| 2,627,072 | 2/1953 | Frommelt et al. |
| 3,022,643 | 2/1962 | Schueller. |
| 3,032,772 | 5/1962 | Fonash. |
| 3,043,300 | 7/1962 | Flagg _____ 128—144 |

FOREIGN PATENTS

| | | |
|---|---|---|
| 639,282 | 4/1962 | Canada. |
| 716,175 | 9/1954 | Great Britain. |
| 839,647 | 6/1960 | Great Britain. |

WILLIAM E. KAMM, Primary Examiner

U.S. Cl. X.R.

2—2.1; 62—159; 165—32; 244—117